United States Patent
Leach et al.

(10) Patent No.: US 7,062,539 B2
(45) Date of Patent: Jun. 13, 2006

(54) USING STATE INFORMATION IN A DISTRIBUTED ENVIRONMENT

(75) Inventors: Paul J. Leach, Seattle, WA (US); Chris Kaler, Sammamish, WA (US); Ferhan Elvanoglu, Redmond, WA (US); Mark H. Lucovsky, Sammamish, WA (US); Shaun D. Pierce, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 81 days.

(21) Appl. No.: 10/968,731

(22) Filed: Oct. 19, 2004

(65) Prior Publication Data

US 2005/0080865 A1    Apr. 14, 2005

Related U.S. Application Data

(63) Continuation of application No. 10/099,577, filed on Mar. 14, 2002, now Pat. No. 6,823,369.

(60) Provisional application No. 60/275,809, filed on Mar. 14, 2001.

(51) Int. Cl.
*G06F 15/16* (2006.01)

(52) U.S. Cl. ...................... 709/206; 709/201; 709/203; 709/217; 709/219

(58) Field of Classification Search ........ 709/200–203, 709/205–206, 217–220, 246; 710/5, 19; 707/10, 201

See application file for complete search history.

(56) References Cited

U.S. PATENT DOCUMENTS

| | | | |
|---|---|---|---|
| 5,218,680 A * | 6/1993 | Farrell et al. ............... | 709/215 |
| 6,106,573 A * | 8/2000 | Mahalingaiah et al. ..... | 717/128 |
| 6,243,830 B1 * | 6/2001 | Nakatsugawa ............... | 714/15 |
| 6,510,439 B1 * | 1/2003 | Rangarajan et al. ........ | 709/203 |
| 6,581,095 B1 * | 6/2003 | Kim .......................... | 709/220 |
| 6,665,756 B1 * | 12/2003 | Abramson et al. .......... | 710/107 |
| 6,694,429 B1 * | 2/2004 | Kalmanek et al. .......... | 713/153 |

* cited by examiner

*Primary Examiner*—Bharat Barot
(74) *Attorney, Agent, or Firm*—Workman Nydegger

(57) ABSTRACT

Processing a response to a network request using information that was transplanted into the response from a specific portion of the request. A requesting computer system generates an electronic request that includes the specific portion. The requesting computer system then submits the request to a responding computer system, which processes the request to form a response to the request. During processing of the request, the responding system transplants the specific portion of the request to the response. The responding computer system then transmits the response to the request to a processing computer system that processes the request. The processing computer system receives the response and extracts the information from the specific portion of the response. The processing computer system then uses the extracted information to process the request.

12 Claims, 4 Drawing Sheets

USING STATE INFORMATION IN A DISTRIBUTED ENVIRONMENT

CROSS-REFERENCE TO RELATED APPLICATIONS

The present application is a continuation application of commonly-assigned U.S. patent application Ser. No. 10/099,577 filed Mar. 14, 2002 now U.S. Pat. No. 6,823,369, entitled "Using State Information in a Distributed Environment". That patent application claims priority to U.S. provisional patent application Ser. No. 60/275,809, filed Mar. 14, 2001, and entitled "Identity-Based Service Communication Using XML Messaging Interfaces", both of which are incorporated herein by reference in their entirety.

BACKGROUND OF THE INVENTION

1. The Field of the Invention

The present invention relates to network messaging. More specifically, the present invention relates to methods, systems and computer program products for using a portion of a request and response to maintain state information that is helpful to process the response.

2. Background and Relevant Art

Computer networks have enhanced our ability to communicate and access information by allowing one computer or device (hereinafter both referred to as a "computing system") to communicate over a network with another computing system using electronic messages. In order for such electronic messaging to be meaningful, the receiving computing system must process the received electronic message correctly. For example, an encrypted e-mail message must be decrypted using the proper decryption algorithm, then parsed into its various components (e.g., message body and "from", "to", "cc" and "time sent" header fields). If decryption or parsing are performed in an incorrect manner, the e-mail would not be able to be displayed properly to a user.

Often, supplemental information is necessary or helpful in order to appropriately process a received electronic message. Sometimes, that supplemental information is locally available for retrieval at the time the electronic message is received. Other times, information from another network location is accessed in order to appropriately process the received network message.

Often, much of the information needed to process an electronic message is included within the electronic message itself. For example, often the network message has a header field that includes information for processing the message. However, the number and types of network fields are often restricted to particular types of data. Including such information in header fields of the electronic message is not helpful if the information does not conform to the format required by the header fields.

One conventional technology that allows for the information to have a more flexible format involves the use of electronic "cookies". When a client navigates to a particular network site, that network site has the client store a "cookie" if cookies are enabled on the client. The cookie contains text information that is useful for the network site to process subsequent requests received from the client. When the client submits a subsequent request to the network site, the client browser is configured to automatically transmit the cookie to the network site as well.

Cookies are often used to provide a convenient customized experience for a client based on client preferences. For example, a weather web site may store the zip code of the client so that the web site may immediately provide the local forecast without asking again for the user to enter the zip code. Accordingly, when a cookie is included in an electronic message, the network site may use the cookie to process the electronic message. Also, the types and structure of information included in a cookie is practically unrestricted so long as that information may be expressed within the character set that is allowed by the cookie protocol, and so long as the network site is capable of interpreting the information given its type and structure.

Although cookies are useful in their operating environment, the operating environment for cookies is fairly restricted. For example, the use of cookies involves the flow of information from a browsing client to a network server. Typically, servers only provide cookies to a client so that the client may store the cookie for later return to the server. In the mean time, the client does not typically do anything else to the cookie other than store the cookie. In contrast, servers do not provide cookies to a client so that the client can use it to process an electronic message from the server. Accordingly, cookies involve only a one-way flow of information from a server to a client. In addition, cookies are typically only used in a browsing environment.

Accordingly, what is desired are mechanisms for providing information needed to process an electronic message regardless of whether the electronic message is from a client or a server, and regardless of whether the electronic message is related to a browse request.

BRIEF SUMMARY OF THE INVENTION

The foregoing problems with the prior state of the art are overcome by the principles of the present invention, which are directed towards methods, systems and computer program products for processing a response to a network request using information that was echoed into the response from an echo portion of the request.

The principles of the present invention may be practiced in a network environment that includes a requesting computing system (e.g., a computer or device) that transmits an electronic request to a responding computing system. The responding computing system then sends the response to a processing computing system that processes the response to the request. The processing computer system that processes the response may be the same computing system as the requesting computing system that transmitted the request, although that need not be the case.

The requesting computing system accesses an electronic request that includes a special "echo" portion. The requesting computing system may access the request by receiving the request from another computing system, or by generating the request. The requesting computing system inserts information in the echo portion that would be helpful in processing a response to the request. For example, such information may include state information that describes session information or other state information that is relevant to processing the response to the request. The electronic request is then submitted to the responding computing system.

The responding computing system then processes the request to form a response to the request. During processing of the request, the responding system transplants the echo portion of the request to the response. There is no need for the responding computing system to even be able to interpret the content of the echo header. The responding computing system then transmits the response, along with the special echo portion, to the processing computing system that processes the request.

The processing computing system receives the response and extracts the information from the echo portion of the response. The processing computing system then uses the extracted information to process the request.

Consider the situation in which the requesting computing system and the processing computing system are the same. In that instance, the requesting computing system need not save the information that it provided in the echo portion of the request. Instead, the requesting computing system may not persist the information at all after submitting the request. The requesting computing system is assured that it will receive the state information needed to process the request within the response to the request itself. Accordingly, the requesting computing system may save memory in not having to store the information.

Also, the requesting computing system may be assured that it need not pause other processing to ensure that the requesting computing system will have the same state as it did when it transmitted the request. Instead, the echo portion may have a record of the relevant state of the requesting computing system as it existed at the time the request was transmitted. Accordingly, memory and processing capacity are improved.

Even if the requesting computing system that submits the request and the processing computing system that processes the response are different computing systems, the principles of the present invention still result in processing efficiencies. For example, the processing computing system need not store the information or seek the information from another site. Instead, the principles of the present invention allow a mechanism for the requesting computing system to communicate to the processing computing system any parameters that are needed or desirable to process the request. This is the case even though the requesting computing system and the processing computing system are not in direct communication, but only indirect communication through the responding computing system that receives the request from the requesting computing system, and transmits the response to the processing computing system.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
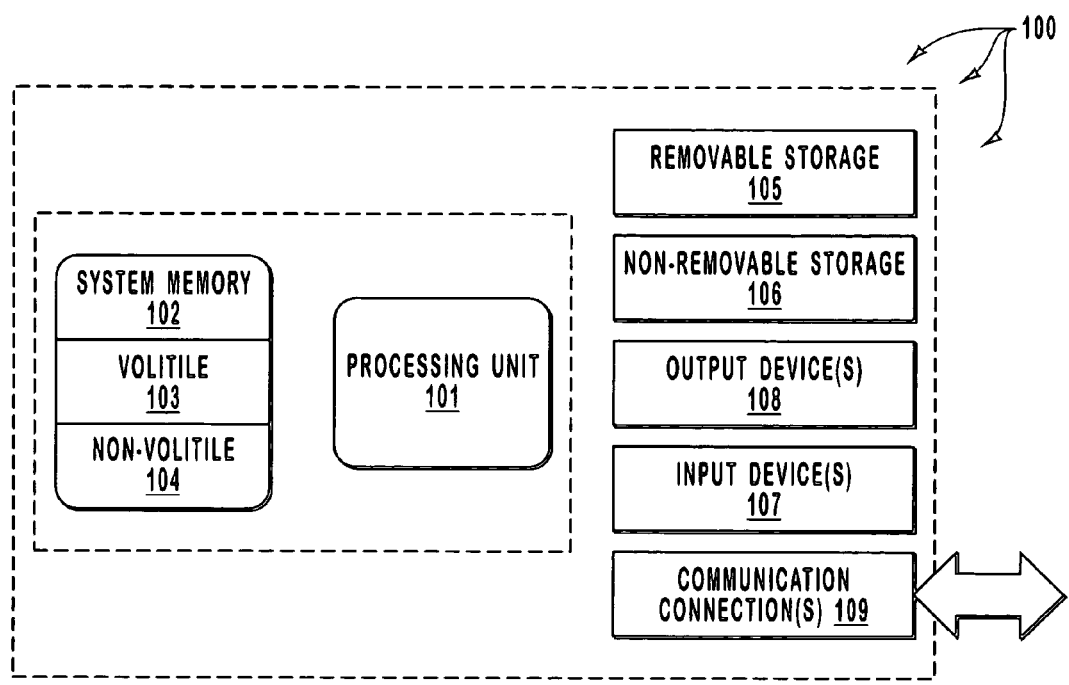
FIG. 1 illustrates a suitable operating environment for the principles of the present invention.

DETAILED DESCRIPTION OF THE
PREFERRED EMBODIMENTS

The present invention extends to methods, systems and computer program products for processing a response to a network request using information that was echoed into the response from an echo portion of the request. A requesting computing system generates an electronic request that includes a special "echo" portion. The requesting computing system inserts information in the echo portion that would be helpful in processing a response to the request, and then submits the request to a responding computing system. The responding computing system processes the request to form a response to the request. In this description and in the claims, the term "request" is defined as any electronic message, and the term "response" is defined as any electronic message that is directly or indirectly associated with the request, regardless of the content and form of the response, and regardless of whether the response is in accordance with the same protocols as the request.

During processing of the request, the responding computing system transplants the echo portion of the request to the response. The responding computing system then transmits the response to a processing computing system that processes the response. The processing computing system receives the response and extracts the information from the echo portion of the response. The processing computing system then uses the extracted information to process the request.

The embodiments of the present invention may be described in the general context of computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions or data structures and which may be accessed by a general-purpose or special-purpose computer system.

When information is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

Computer-executable instructions may be, for example, routines, programs, objects, components, data structures, or the like, that perform particular tasks or implement particular abstract data types. Typically, the functionality of the program modules may be combined or distributed as desired in various embodiments.

FIG. 1 illustrates an example of a suitable computing system or device 100 in which the invention may be implemented. In its most basic form, device 100 typically includes a processing unit 101 and memory 102. Depending on the exact configuration and type of computing device 100, memory 102 may be volatile memory 103 (such as RAM), non-volatile memory 104 (such as ROM, flash memory, etc.) or some combination of the two. Additionally, device 100 may also have mass storage that includes removable storage 105 and/or non-removable storage 106. Similarly, device 100 may have input devices 107 such as keyboards, mouse, keypad, or the like depending on the type of device. The device 100 may also includes output devices 108 such as monitors, displays, speakers, or the like depending on the type of device.

The device 100 communicates in a network environment as illustrated in subsequent figures and as described in the corresponding description. Accordingly, the device 100 has communication connections 109 through which the device 100 may be permanently and/or selectively coupled to networks. The device 100 may be any device capable of processing computer-executable instructions. Such devices are well known in the art and thus will not be discussed at length here in order to avoid obscuring the principles of the present invention.

The device 100 is only one example of a suitable operating environment and is not intended to suggest any limitation as to the scope of use of functionality of the invention. Other well known computing systems, environments, and/or configurations that may be suitable for use with the invention include, but are not limited to, network environments that include personal computers, server computers, handheld or laptop devices, multiprocessor systems, microprocessor-based systems, programmable consumer electronics, network PCs, minicomputers, mainframe computers, distributed computing environments that include any of the above systems or devices, or the like.

In this description and in the following claims, a "computing system" is defined as one or more software modules, one or more hardware modules, or combinations thereof, that work together to perform operations on electronic data. For example, the definition of computing system includes the hardware components of a personal computer, as well as software modules, such as the operating system of the personal computer. The physical layout of the modules is not important. A computing system may include one or more computers coupled via a computer network. Likewise, a computing system may include a single physical device (such as a mobile phone or Personal Digital Assistant "PDA") where internal modules (such as a memory and processor) work together to perform operations on electronic data.

Figure 2:
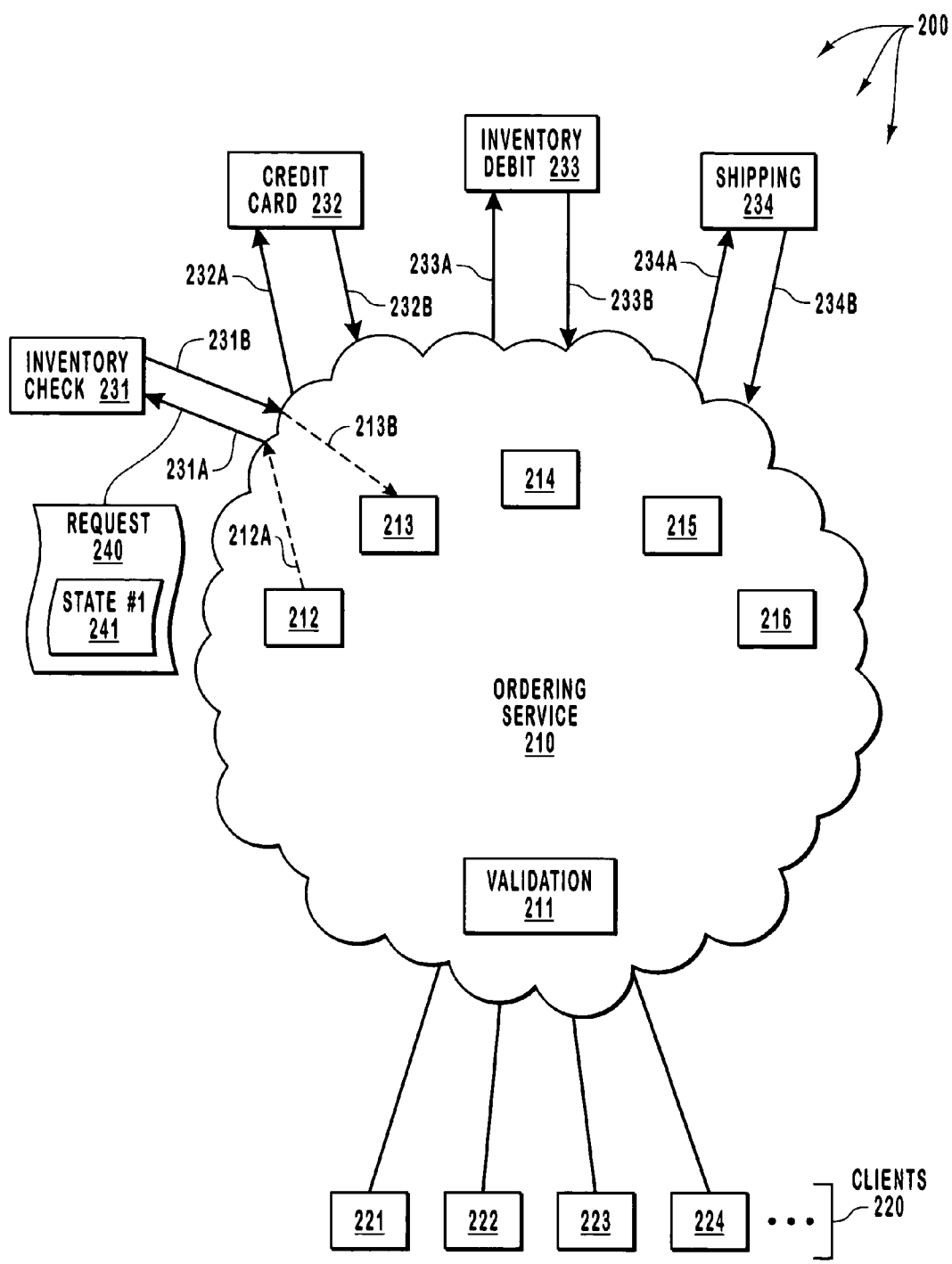
FIG. 2 illustrates an example network environment in the form of a network ordering service that receives orders from various clients and processes those order using external network services.

FIG. 2 illustrates an example network environment 200 in which the present invention may operate. The network environment 200 includes a number of clients 220 that may order different products via an ordering service 210. There are four clients 221 through 224 illustrated although any number of clients may place orders via the ordering service 210 as represented by the horizontal ellipses.

The ordering service 210 includes a validation module 211 that receives ordering requests and validates those ordering requests. The ordering service 210 includes a number of different computing systems 212 through 216. In response to an order, the ordering service 210 generates a request 240 that includes an echo portion that is transplanted from the request to the response regardless of the content of the echo portion. In this case, the echo portion includes state information (as represented by element 241 labeled state #1) that is relevant in order to process a response to the request.

The ordering service 210 submits the request 241 as represented by arrow 231A to an inventory check service 231 inquiring as to the current inventory for the item(s) ordered by the client. The inventory check service 231 responds to the request as represented by arrow 231B. The state information in the echo portion of the request is transplanted to the response. Accordingly, the ordering service 210 may extract the state information and use the state information to process the response to the request.

In the illustrated example, one of the computing systems 212 in the ordering service submits the request as represented by arrow 212A thereby acting as a requesting computing system. However, a different computing system 213 in the ordering service receives the response to the request as represented by arrow 213B. Accordingly, the ordering service 210 need not locally store the state information for the request, and need not stop processing until the response is received. Even so, whatever computing system receives the response may process the request.

The ordering service 210 is aware of what information would be needed to process the request. For example, in the case of the request to the inventory check service 231, the state information may include the inventory item being checked on, an identifier for the client that submitted an order, and a sequence identifying that the next steps in processing the order is to perform a credit card debit, decrement the inventory levels to reflect the order, and to contact shipping to coordinate delivery of the ordered items.

Accordingly, the ordering service 210 may then place a request 232A to the credit card service 232 to debit the credit card, receive a response 232B acknowledging sufficient funds and confirming the debiting of the credit card account, submit a request 233A to the inventory debit service 233 to adjust the inventory levels to reflect the order, receive a response 233B acknowledging the inventory adjustment, send a request 234A to a shipping service 234 to ship the items ordered, and receive a response 234B acknowledging shipment.

Accordingly, the ordering service 210 coordinates the shipment without having to locally store any state information at all regarding the order, even if the clients that made the order, and the various services needed to complete the order, are distributed over a network such as, for example, the Internet.

Figure 3:
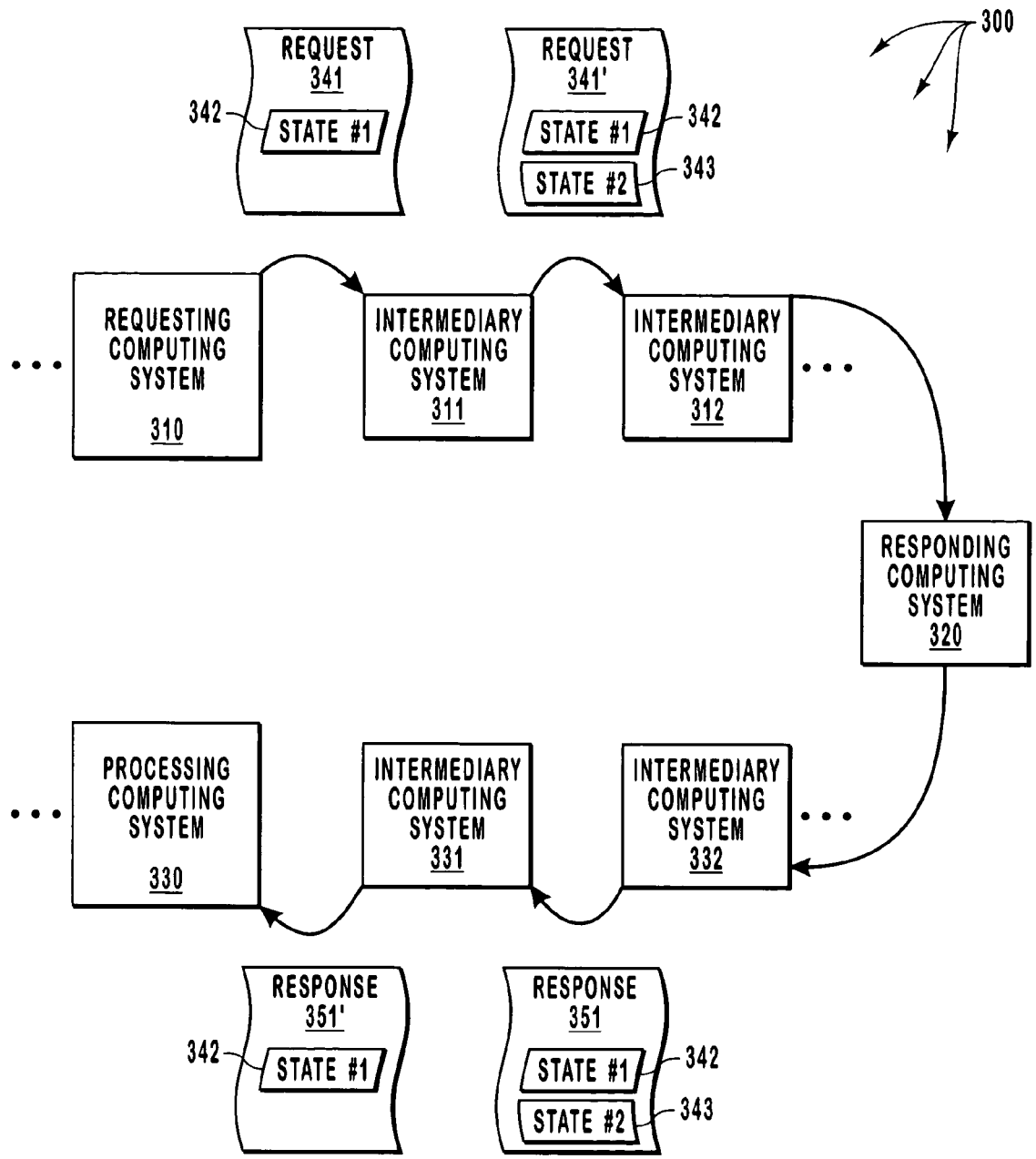
FIG. 3 illustrates the requesting, responding, and processing computing systems interacting potentially through one or more intermediary computing systems.

FIG. 3 illustrates potential paths associated with a requesting computing system 310 submitting a request 341 that includes state information 342, and a processing computing system 330 receiving a corresponding response 351' that also includes the state information 342. FIG. 3 will be described with frequent reference to FIG. 4, which illustrates a flowchart of a method 400 of using state information in a distributed environment in accordance with the present invention.

Figure 4:
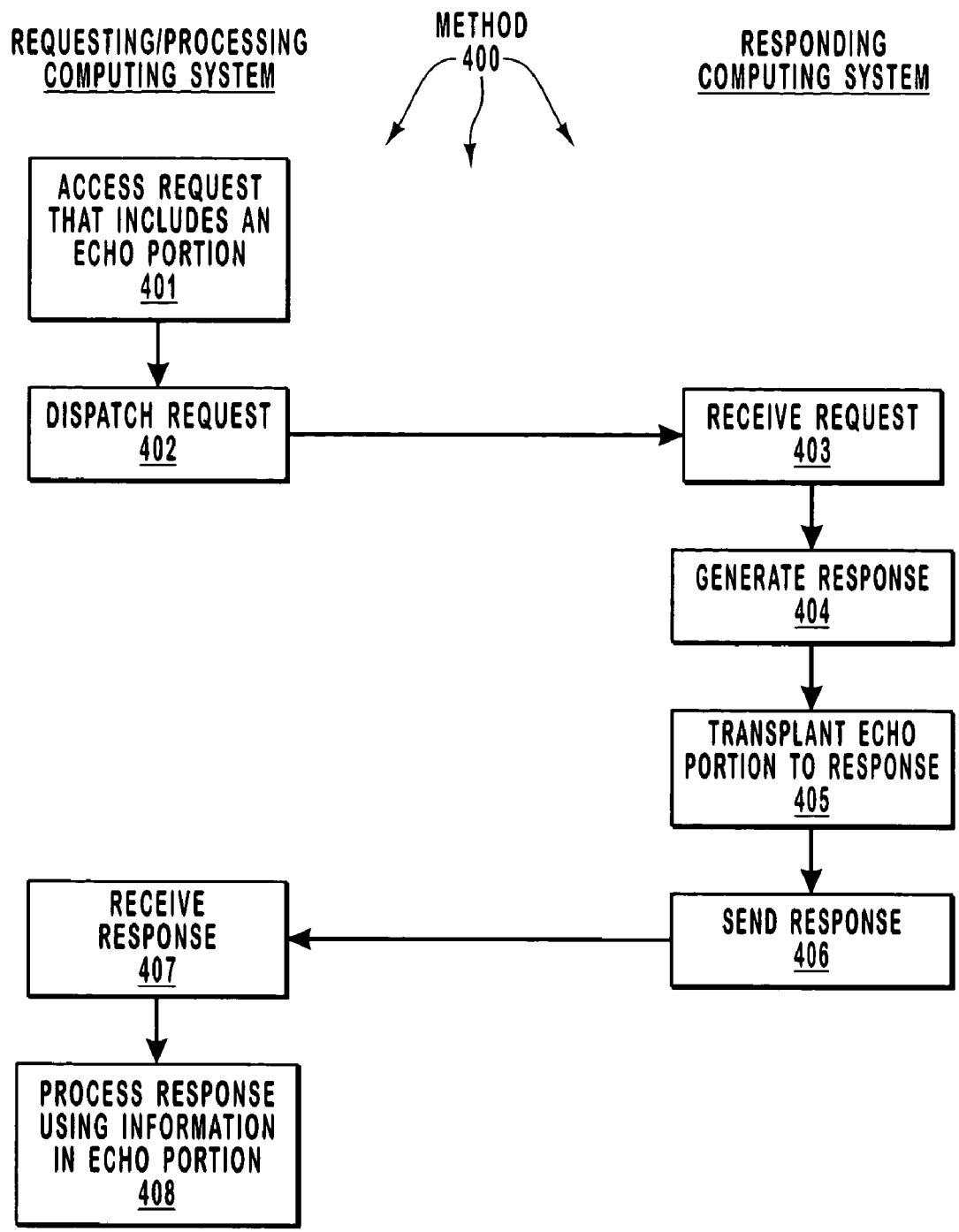
FIG. 4 illustrates a flowchart of a method in accordance with the present invention.

Referring to FIG. 4, some of the illustrated acts are performed by the requesting computing system 310 or the processing computing system 330 as represented in the left column of FIG. 4 under the heading "REQUESTING/PROCESSING COMPUTING SYSTEM". Other acts are performed by the responding computing system 320 as represented in the right column of FIG. 4 under the heading "RESPONDING COMPUTING SYSTEM".

Referring now to both FIGS. 3 and 4, the method 400 first includes an act of the requesting computing system accessing a request that includes a portion that is to be transferred to a response to the request without affecting the processing of the request (act 401). That portion is often referred to herein as an "echo portion" since that portion is transferred from the dispatched request to the returned response. Accordingly, the information within the request is echoed back in the response.

The request may be accessed either by the requesting computing system receiving the request from another computing system or by generating the request itself. If received from another computing system, the requesting computing system may insert its own state information in the echo portion, or else insert its own echo portion having state information relevant to processing a response to the request.

The requesting computing system 310 then dispatches the request to the responding computing system 320 (act 402). For example, referring to FIG. 3, the requesting computing system dispatches the request 341 having the echo portion 342 that contains state information. Although the requesting computing system may dispatch the request directly to the responding computing system, the dispatching may be through one or more intermediary computing systems. For example, in FIG. 3, the requesting computing system 310 submits the request via intermediary computing systems 311 and 312 to a responding computing system 320. The original request may not even address the responding computing system, but may be redirected by one of the intermediary computing systems 311 or 312 to the responding computing system.

Any of the intermediary computing systems may insert state information in the echo portion, or else add a new echo portion with the new state information as the request traverses from the requesting computing system 310 to the responding computing system 320. For example, intermediary computing system 311 adds state information 343 to the request 341 to generate an altered request 341'. The state information may be structured or unstructured, and may be encrypted when so desired.

After receiving the request (act 403), the responding computing system generates a response (act 404) and transplants any of the echo portions (e.g., state #1 portion labeled 342 and state #2 portion labeled 343) into the response (act 405). The responding computing system then returns the corresponding response 406. In FIG. 3, the response 351 having state information 343 and 342 is returned first to intermediary computing system 332 and then to intermediary computing system 331. Intermediary computing system 331 may process the response by using the state information 343 that was included by the intermediary computing system 311. The intermediary computing system 331 may then remove the state information 343 and then forward the altered response 351' to the processing computing system 330.

In the sense that intermediary computing system 311 accessed the request (albeit from requesting computing system 310), and intermediary computing system 331 processed the response (albeit before sending the response to the processing computing system 330), the intermediary computing systems 311 and 331 may also be considered to be requesting and processing computing systems, respectively.

The processing computing system 330 then receives the response (act 407) that includes the state information as it existed when the requesting computing system 310 originally send the request. The processing computing system 330 extracts the state information 342 and processes the response (act 408) based on the state information. After processing the response, the processing computing system 330 may then forward the response to other processing systems as represented by the horizontal ellipses to the left of the processing computing system 330.

The requesting computing system 310 may be the same computing system as the processing computing system 330. However, that need not be the case. Even if the requesting computing system 310 is different than the processing computing system 330, the processing computing system 330 has the state information that may be used to process the response to the request. Accordingly, there is no need for the requesting computing system, or the processing computing system to save the state information that is relevant to processing the response. Although intermediary computing system 311 and intermediary computing system 331 may be the same, they may also be different as well. The same applies for the intermediary computing system 312 and the intermediary computing system 332.

The responding computing system 320 may send more than one response that corresponds to the request. The responding computing system 320 may transplant the state information from the response to each of the responses, thereby facilitating processing of each of the responses.

In this manner, state information may be used in a distributed environment without requiring that the requesting computing system store the state information, or pause processing until a response to the request is received. In addition, the processing computing system may appropriately process responses to the request without beforehand storing or otherwise having access to all of the relevant state information needed or desirable to processing the response.

The present invention is not limited to messaging using any specific protocol and format. However, one example protocol that may be used to implement the principles of the present invention is called Simple Object Access Protocol (SOAP). The following is an example structure in which the state information is included in a unique "echoback" header within a Simple Object Access Protocol (SOAP) envelope:

```
1.  <Envelope>
2.    <Header>
        .
        .
        .
3.      <echoBack>
4.         ECHOBACK INFORMATION
5.      </echoBack>
        .
        .
        .
6.    </Header>
7.    <Body>
8.       REQUEST
9.    </Body>
10. </Envelope>
```

In this example, the echoback information may include one or more free-form eXtensible Markup Language (XML) documents. While using the echoback header in the header portion of a SOAP envelope allows for the echoback information to be included in HyperText Transport Protocol (HTTP) requests in this example, the echo portion may be provided using other mechanisms as well. There is no requirement that the echo portion be implemented in the context of a SOAP envelope, or within an XML document.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A computer program product for use in a computer network environment that includes a requesting computing system configured to dispatch a request, a responding computing system configured to generate a response to the request, and a processing computing system configured to process a response to the request, wherein each of the requesting computing system and the responding computing system have independent processors, the computer program product comprising one or more computer-readable media having computer-executable instructions for implementing a method for processing the response to the request without the processing computing system beforehand having all of the state information relevant to process the request, the method comprising the following:

the requesting computing system generating a request that includes a portion that is to be transferred with a request and returned in a response to the request and without affecting the processing of the request, the portion including state information relevant for the processing computing entity to process a response to the request;

the requesting computing system dispatching the request to the responding computer entity and without storing the state information;

the processing computer system receiving a response to the request, the response including the portion that was transferred from the request without affecting the processing of the request; and processing the response using the state information included in the response.

2. A computer program product in accordance with claim 1, wherein the requesting computing system and the processing computing system are the same computing system.

3. A computer program product in accordance with claim 1, wherein the requesting computing system and the processing computing system are different computing systems.

4. A computer program product as recited in claim 1, wherein at least one of the request and response comprise an electronic message.

5. A computer program product for use in a computer network environment that includes a requesting computing system configured to dispatch a request, a responding computing system configured to generate a response to the request, and a processing computing system configured to process a response to the request, wherein each of the requesting computing system and the responding computing system have independent processors, the computer program product comprising one or more computer-readable media having computer-executable instructions for implementing a method for processing the response to the request without the processing computing system beforehand having all of the state information relevant to process the request, the computer program product comprising:

computer executable instructions for a requesting computing system to dispatch a request that includes an echo portion that is to be transferred with a request and returned in a response to the request without affecting the processing of the request, the portion including state information relevant for the processing computing entity to process a response to the request, wherein the requesting computer system sends the request without storing the state information to a responding computer system;

computer executable instructions for a responding computer system to generate the response without being affected by the echo portion, and to transplant the echo portion in the response;

computer executable instructions for a processing computer system to receive and process a response to the request using the state information that was included in the response.

6. A computer program product in accordance with claim 5, wherein the requesting computing system and the processing computing system are the same computing system.

7. A computer program product in accordance with claim 5, wherein the requesting computing system and the processing computing system are different computing systems.

8. A computer program product as recited in claim 5, wherein at least one of the request and response comprise an electronic message.

9. In a computer network environment that includes a requesting computing system configured to dispatch a request, a responding computing system configured to generate a response to the request, and a processing computing system configured to process a response to the request, wherein each of the requesting computing system and the responding computing system have independent processors, a method for processing the response to the request without the processing computing system beforehand having all of the state information relevant to process the request, the method comprising:

requesting computing system to dispatch a request that includes an echo portion that is to be transferred with a request and returned in a response to the request without affecting the processing of the request, the portion including state information relevant for the processing computing entity to process a response to the request, wherein the requesting computer system sends the request without storing the state information to a responding computer system;

wherein a responding computer system generates the response without being affected by the echo portion, and transplants the echo portion in the response; and wherein a processing computer system receives and processes a response to the request using the state information that was included in the response.

10. A method as recited in claim 9, wherein the requesting computing system and the processing computing system are the same computing system.

11. A method as recited in claim 9, wherein the requesting computing system and the processing computing system are different computing systems.

12. A method as recited in claim 9, wherein at least one of the request and response comprise an electronic message.

* * * * *